(12) United States Patent  
Akahori et al.

(10) Patent No.: US 8,483,860 B2
(45) Date of Patent: Jul. 9, 2013

(54) ENVIRONMENTAL LOAD AMOUNT CALCULATION METHOD, EXECUTION PROGRAM THEREFOR, AND EXECUTION APPARATUS THEREFOR

(75) Inventors: Tomohiko Akahori, Yokohama (JP); Osamu Namikawa, Hadano (JP)

(73) Assignee: Hitachi, Ltd., Tokyo (JP)

( * ) Notice: Subject to any disclaimer, the term of this patent is extended or adjusted under 35 U.S.C. 154(b) by 1013 days.

(21) Appl. No.: 12/533,541

(22) Filed: Jul. 31, 2009

(65) Prior Publication Data
US 2010/0100215 A1    Apr. 22, 2010

(30) Foreign Application Priority Data

Oct. 17, 2008   (JP) ................................ 2008-269129

(51) Int. Cl.
 *G06F 19/00*  (2006.01)
 *G05D 3/12*   (2006.01)
 *G01N 37/00*  (2006.01)

(52) U.S. Cl.
USPC ............ 700/99; 700/96; 700/108; 700/109; 700/159; 700/291; 700/297; 702/81; 702/84

(58) Field of Classification Search
USPC .............................. 700/99, 96, 98; 702/81, 84
See application file for complete search history.

(56) References Cited

U.S. PATENT DOCUMENTS

| | | | | | |
|---|---|---|---|---|---|
| 4,106,097 | A | * | 8/1978 | Fox et al. | 700/295 |
| 4,363,101 | A | * | 12/1982 | Czerniejewski | 700/291 |
| 4,876,639 | A | * | 10/1989 | Mensch, Jr. | 703/27 |
| 5,514,958 | A | * | 5/1996 | Germer | 324/74 |
| 5,576,700 | A | * | 11/1996 | Davis et al. | 340/3.31 |
| 5,751,580 | A | * | 5/1998 | Chi | 700/101 |
| 5,852,560 | A | * | 12/1998 | Takeyama et al. | 700/97 |
| 5,878,433 | A | * | 3/1999 | Miyamoto | 1/1 |
| 5,963,457 | A | * | 10/1999 | Kanoi et al. | 700/291 |
| 6,591,225 | B1 | * | 7/2003 | Adelman et al. | 702/182 |
| 6,879,884 | B2 | * | 4/2005 | Miyashita et al. | 700/291 |
| 7,200,518 | B1 | * | 4/2007 | Smith | 702/180 |
| 7,373,222 | B1 | * | 5/2008 | Wright et al. | 700/295 |
| 2001/0011196 | A1 | * | 8/2001 | Nagaoka et al. | 700/95 |
| 2003/0144986 | A1 | * | 7/2003 | Ueno et al. | 707/1 |
| 2004/0225413 | A1 | * | 11/2004 | Miyashita et al. | 700/291 |
| 2004/0267395 | A1 | * | 12/2004 | Discenzo et al. | 700/99 |

FOREIGN PATENT DOCUMENTS

JP       08-235245       9/1996

* cited by examiner

*Primary Examiner* — Charles Kasenge
*Assistant Examiner* — Thomas Stevens
(74) *Attorney, Agent, or Firm* — McDermott Will & Emery LLP

(57) ABSTRACT

The present application relates to a technique of calculating an environmental load amount of each product produced on a production line including types of processing apparatuses. Power consumption required for producing a product is obtained more accurately and in an earlier stage. Power consumption required for producing each product is obtained by using the power consumption for each product with respect to each apparatus.

6 Claims, 17 Drawing Sheets

APPARATUS CHARACTERISTIC-COEFFICIENT RELATION TL 132

| CATEGORY | COEFFICIENT | PROCESSING APPARATUS NAME | MODEL NUMBER | MAIN POWER CONSUMING MODULE | OPERATION PATTERN | PROCESSING TYPE | PROCESSING TIME | RATED POWER (Kw) | ACTUAL POWER CONSUMPTION (Kw) | RATIO |
|---|---|---|---|---|---|---|---|---|---|---|
| 1 | 0.20 | FIRST PROCESSING APPARATUS | A-011 | MOTOR | INTERMITTENT | COMPONENT MOUNTING | CONSTANT | 12 | 2.3 | 0.19 |
| | | FIRST PROCESSING APPARATUS | A-012 | MOTOR | INTERMITTENT | COMPONENT MOUNTING | CONSTANT | 10 | 2.1 | 0.21 |
| 2 | 0.30 | SECOND PROCESSING APPARATUS | B-011 | MOTOR | INTERMITTENT | COMPONENT MOUNTING | DIFFERENT | 27 | 8.1 | 0.30 |
| | | SECOND PROCESSING APPARATUS | B-012 | MOTOR | INTERMITTENT | COMPONENT MOUNTING | DIFFERENT | 25 | 7.5 | 0.30 |
| 3 | 0.25 | THIRD PROCESSING APPARATUS | C-011 | MOTOR | INTERMITTENT | TEST | DIFFERENT | 20 | 5.2 | 0.26 |
| | | FOURTH PROCESSING APPARATUS | D-011 | MOTOR | INTERMITTENT | TEST | DIFFERENT | 18 | 4.3 | 0.24 |
| 4 | 0.40 | FIFTH PROCESSING APPARATUS | E-011 | HEATER | STEADY | WARMING | CONSTANT | 45 | 17.1 | 0.39 |
| | | FIFTH PROCESSING APPARATUS | E-012 | HEATER | STEADY | WARMING | CONSTANT | 40 | 16.8 | 0.42 |
| 5 | 0.50 | SIXTH PROCESSING APPARATUS | F-011 | HEATER | STEADY | COMPONENT MOUNTING | DIFFERENT | 50 | 25.0 | 0.50 |
| | | SIXTH PROCESSING APPARATUS | F-012 | HEATER | STEADY | COMPONENT MOUNTING | DIFFERENT | 60 | 30.0 | 0.50 |

132a  132b  132c  132d  132e  132f  132g  132h  132i  132j  132k

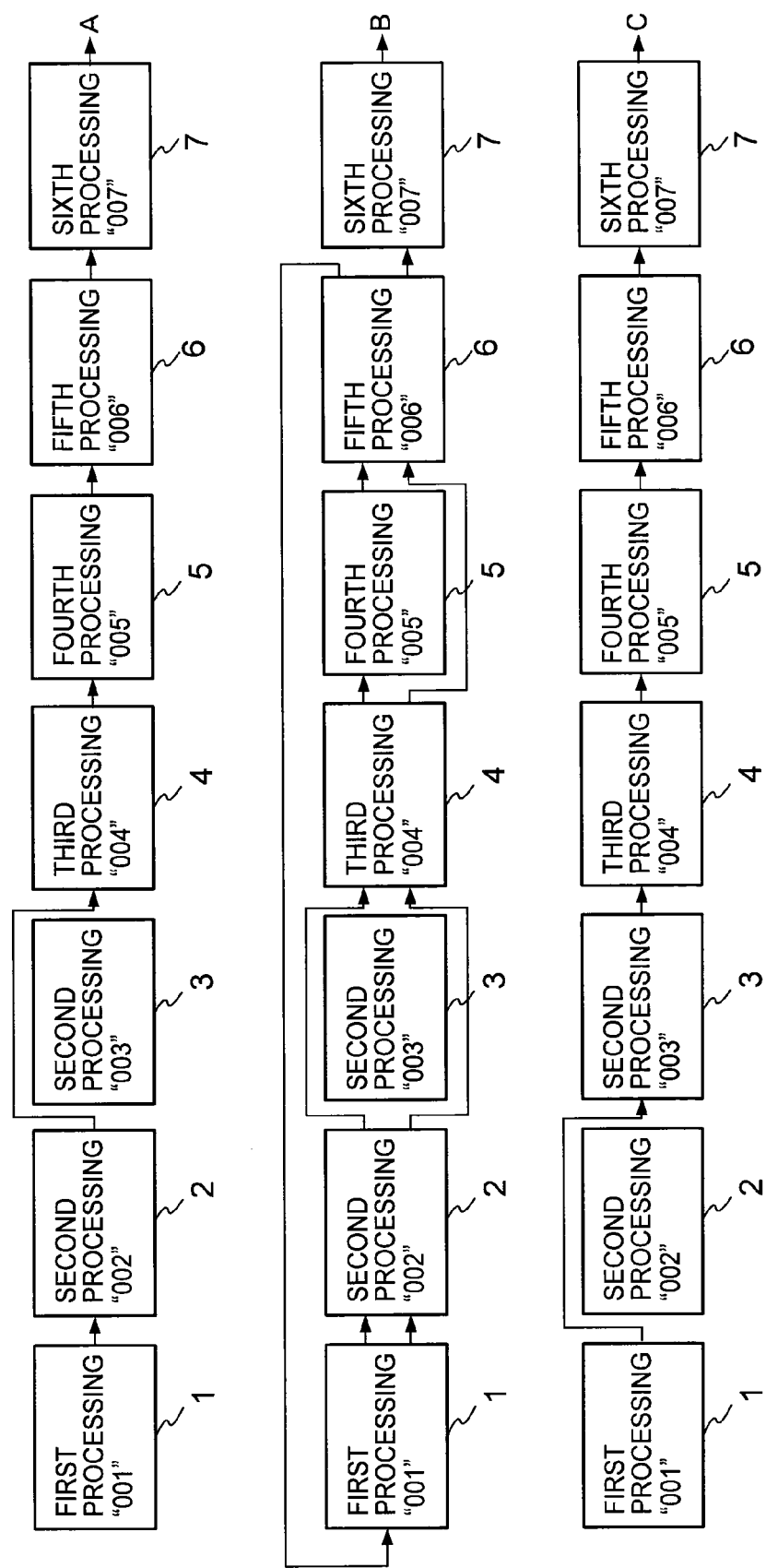

FIG. 3

APPARATUS CHARACTERISTIC-COEFFICIENT RELATION TL 132

| CATEGORY | COEFFICIENT | PROCESSING APPARATUS NAME | MODEL NUMBER | MAIN POWER CONSUMING MODULE | OPERATION PATTERN | PROCESSING TYPE | PROCESSING TIME | RATED POWER (Kw) | ACTUAL POWER CONSUMPTION (Kw) | RATIO |
|---|---|---|---|---|---|---|---|---|---|---|
| 1 | 0.20 | FIRST PROCESSING APPARATUS | A-011 | MOTOR | INTERMITTENT | COMPONENT MOUNTING | CONSTANT | 12 | 2.3 | 0.19 |
|   |      | FIRST PROCESSING APPARATUS | A-012 | MOTOR | INTERMITTENT | COMPONENT MOUNTING | CONSTANT | 10 | 2.1 | 0.21 |
| 2 | 0.30 | SECOND PROCESSING APPARATUS | B-011 | MOTOR | INTERMITTENT | COMPONENT MOUNTING | DIFFERENT | 27 | 8.1 | 0.30 |
|   |      | SECOND PROCESSING APPARATUS | B-012 | MOTOR | INTERMITTENT | COMPONENT MOUNTING | DIFFERENT | 25 | 7.5 | 0.30 |
| 3 | 0.25 | THIRD PROCESSING APPARATUS | C-011 | MOTOR | INTERMITTENT | TEST | DIFFERENT | 20 | 5.2 | 0.26 |
|   |      | FOURTH PROCESSING APPARATUS | D-011 | MOTOR | INTERMITTENT | TEST | DIFFERENT | 18 | 4.3 | 0.24 |
| 4 | 0.40 | FIFTH PROCESSING APPARATUS | E-011 | HEATER | STEADY | WARMING | CONSTANT | 45 | 17.1 | 0.39 |
|   |      | FIFTH PROCESSING APPARATUS | E-012 | HEATER | STEADY | WARMING | CONSTANT | 40 | 16.8 | 0.42 |
| 5 | 0.50 | SIXTH PROCESSING APPARATUS | F-011 | HEATER | STEADY | COMPONENT MOUNTING | DIFFERENT | 50 | 25.0 | 0.50 |
|   |      | SIXTH PROCESSING APPARATUS | F-012 | HEATER | STEADY | COMPONENT MOUNTING | DIFFERENT | 60 | 30.0 | 0.50 |

APPARATUS CHARACTERISTIC-CORRELATED SPECIFICATION ITEM TL 133

| CATEGORY | CORRELATED SPECIFICATION ITEM | PROCESSING APPARATUS NAME | MODEL NUMBER | MAIN POWER CONSUMING MODULE | OPERATION PATTERN | PROCESSING TYPE | PROCESSING TIME |
|---|---|---|---|---|---|---|---|
| 1 | NONE | FIRST PROCESSING APPARATUS | A-011 | MOTOR | INTERMITTENT | COMPONENT MOUNTING | CONSTANT |
| | | FIRST PROCESSING APPARATUS | A-012 | MOTOR | INTERMITTENT | COMPONENT MOUNTING | CONSTANT |
| | | FIFTH PROCESSING APPARATUS | E-011 | HEATER | STEADY | WARMING | CONSTANT |
| | | FIFTH PROCESSING APPARATUS | E-012 | HEATER | STEADY | WARMING | CONSTANT |
| 2 | NUMBER OF SURFACE-MOUNTED COMPONENTS | SECOND PROCESSING APPARATUS | B-011 | MOTOR | INTERMITTENT | COMPONENT MOUNTING | DIFFERENT |
| | | SECOND PROCESSING APPARATUS | B-012 | MOTOR | INTERMITTENT | COMPONENT MOUNTING | DIFFERENT |
| | | THIRD PROCESSING APPARATUS | C-011 | MOTOR | INTERMITTENT | TEST | DIFFERENT |
| | | FOURTH PROCESSING APPARATUS | D-011 | MOTOR | INTERMITTENT | TEST | DIFFERENT |
| 3 | NUMBER OF LAYERS | SIXTH PROCESSING APPARATUS | F-011 | HEATER | STEADY | COMPONENT MOUNTING | DIFFERENT |
| | | SIXTH PROCESSING APPARATUS | F-012 | HEATER | STEADY | COMPONENT MOUNTING | DIFFERENT |

PROCESSING APPARATUS INFORMATION TL 134

| APPARATUS ID | PROCESSING APPARATUS NAME | MODEL NUMBER | RATED POWER (kW) | MAIN POWER CONSUMING MODULE | OPERATION PATTERN | PROCESSING TYPE | PROCESSING TIME |
|---|---|---|---|---|---|---|---|
| 001 | FIRST PROCESSING APPARATUS | A-001 | 10 | MOTOR | INTERMITTENT | COMPONENT MOUNTING | CONSTANT |
| 002 | SECOND PROCESSING APPARATUS | B-001 | 20 | MOTOR | INTERMITTENT | COMPONENT MOUNTING | DIFFERENT |
| 003 | SECOND PROCESSING APPARATUS | B-002 | 13 | MOTOR | INTERMITTENT | COMPONENT MOUNTING | DIFFERENT |
| 004 | THIRD PROCESSING APPARATUS | C-001 | 16 | MOTOR | INTERMITTENT | TEST | DIFFERENT |
| 005 | FOURTH PROCESSING APPARATUS | D-001 | 16 | MOTOR | INTERMITTENT | TEST | DIFFERENT |
| 006 | FIFTH PROCESSING APPARATUS | E-001 | 40 | HEATER | CONSTANT | WARMING | CONSTANT |
| 007 | SIXTH PROCESSING APPARATUS | F-001 | 48 | HEATER | CONSTANT | COMPONENT MOUNTING | DIFFERENT |

PRODUCT SPECIFICATION TL 135

| SPECIFICATION ITEM \ PRODUCT NAME | A | B | C | (D) | |
|---|---|---|---|---|---|
| NUMBER OF SURFACE-MOUNTED COMPONENTS | 100 | 200 | 300 | (400) | ~135q |
| AREA (cm$^2$) | 50 | 50 | 100 | (100) | ~135r |
| NUMBER OF LAYERS | 4 | 4 | 8 | (4) | ~135s |
| ... | ... | ... | ... | ... | |

(top row ~135p)

FIG. 7

PRODUCTION PROCESS INFORMATION TL 136

| APPARATUS ID | A | B | C | (D) |
|---|---|---|---|---|
| 001 | 1 | 2 | 1 | (1) |
| 002 | 1 | 2 | 0 | (1) |
| 003 | 0 | 0 | 1 | (0) |
| 004 | 1 | 2 | 1 | (1) |
| 005 | 1 | 1 | 1 | (1) |
| 006 | 1 | 2 | 1 | (1) |
| 007 | 1 | 1 | 1 | (1) |

PRODUCTION NUMBER INFORMATION TL 137

| | | | | |
|---|---|---|---|---|
| PRODUCT NAME | A | B | C | TOTAL |
| PRODUCTION NUMBER | 200 | 200 | 100 | 500 |

137a → PRODUCT NAME row
137b → PRODUCTION NUMBER row

FIG. 9

LINE ENVIRONMENTAL LOAD AMOUNT TL 138

| MEASURED OBJET | POWER CONSUMPTION (Kwh/DAY) |
|---|---|
| LINE AS A WHOLE | 1500 |
| 007 | 600 |

CALCULATION RESULT TL 139

| APPARATUS ID | PROCESSING APPARATUS NAME | MODEL NUMBER | COEFFICIENT | CORRELATED SPECIFICATION ITEM | POWER CONSUMPTION (Kwh) OF PROCESSING APPARATUS | PRODUCTION POWER CONSUMPTION (Kwh/UNIT) FOR EACH PRODUCT | | | |
|---|---|---|---|---|---|---|---|---|---|
| | | | | | | A | B | C | D |
| 001 | FIRST PROCESSING APPARATUS | A-001 | 0.20 | NONE | 50 | 0.07 | 0.14 | 0.07 | (0.07) |
| 002 | SECOND PROCESSING APPARATUS | B-001 | 0.30 | NUMBER OF SURFACE-MOUNTED COMPONENTS | 150 | 0.15 | 0.60 | 0.00 | (0.60) |
| 003 | SECOND PROCESSING APPARATUS | B-002 | 0.30 | NUMBER OF SURFACE-MOUNTED COMPONENTS | 100 | 0.00 | 0.00 | 1.00 | (0.00) |
| 004 | THIRD PROCESSING APPARATUS | C-001 | 0.25 | NUMBER OF SURFACE-MOUNTED COMPONENTS | 100 | 0.09 | 0.31 | 0.23 | (0.32) |
| 005 | FOURTH PROCESSING APPARATUS | D-001 | 0.25 | NUMBER OF SURFACE-MOUNTED COMPONENTS | 100 | 0.11 | 0.22 | 0.33 | (0.44) |
| 006 | FIFTH PROCESSING APPARATUS | E-001 | 0.40 | NUMBER OF LAYERS | 400 | 0.57 | 0.14 | 0.57 | (0.57) |
| 007 | SIXTH PROCESSING APPARATUS | F-001 | 0.50 | NUMBER OF LAYERS | 600 | 1.00 | 1.00 | 2.00 | (2.00) |
| | | | | TOTAL | 1500 | 1.98 | 3.24 | 4.21 | (4.00) |

FIG. 12

FIRST RELATION ACQUISITION DATA INPUT SCREEN

PLEASE INPUT DATA IN EACH ITEM.

| PROCESSING APPARATUS NAME | MODEL NUMBER | APPARATUS CHARACTERISTICS ||||| RATED POWER (Kw) | ACTUAL POWER CONSUMPTION (Kw) |
| --- | --- | --- | --- | --- | --- | --- | --- |
| | | MAIN POWER CONSUMING MODULE | OPERATION PATTERN | PROCESSING TYPE | PROCESSING TIME | | |
| FIRST PROCESSING APPARATUS | A-011 | MOTOR | INTERMITTENT | COMPONENT MOUNTING | CONSTANT | 12 | 2.3 |
| FIRST PROCESSING APPARATUS | A-012 | MOTOR | INTERMITTENT | COMPONENT MOUNTING | CONSTANT | 10 | 2.1 |
| SECOND PROCESSING APPARATUS | B-011 | MOTOR | INTERMITTENT | COMPONENT MOUNTING | DIFFERENT | 27 | 8.1 |
| SECOND PROCESSING APPARATUS | B-012 | MOTOR | INTERMITTENT | COMPONENT MOUNTING | DIFFERENT | 25 | 7.5 |
| THIRD PROCESSING APPARATUS | C-011 | MOTOR | INTERMITTENT | TEST | DIFFERENT | 20 | 5.2 |
| FOURTH PROCESSING APPARATUS | D-011 | MOTOR | INTERMITTENT | TEST | DIFFERENT | 18 | 4.3 |
| FIFTH PROCESSING APPARATUS | E-011 | HEATER | STEADY | WARMING | CONSTANT | 45 | 17.1 |
| FIFTH PROCESSING APPARATUS | E-012 | HEATER | STEADY | WARMING | CONSTANT | 40 | 16.8 |
| SIXTH PROCESSING APPARATUS | F-011 | HEATER | STEADY | COMPONENT MOUNTING | DIFFERENT | 50 | 25.0 |
| SIXTH PROCESSING APPARATUS | F-012 | HEATER | STEADY | COMPONENT MOUNTING | DIFFERENT | 60 | 30.0 |
| | | | | | | | |

[REGISTRATION]

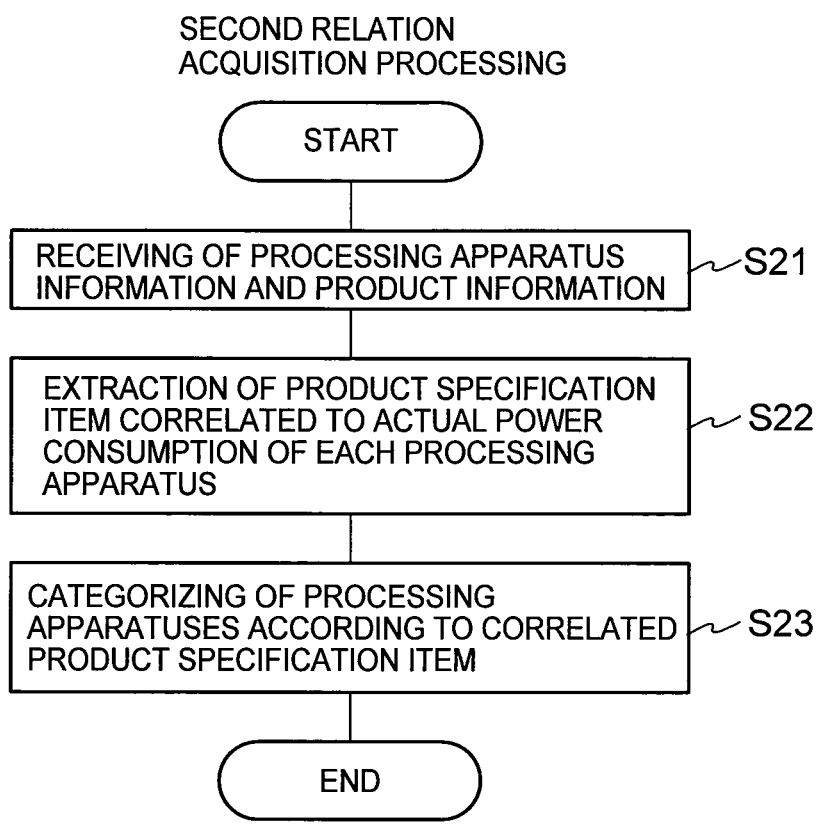

FIG. 14

SECOND RELATION ACQUISITION DATA INPUT SCREEN    154

PLEASE INPUT DATA IN EACH ITEM.

| PROCESSING APPARATUS NAME | MODEL NUMBER | POWER CONSUMPTION (Kwh/UNIT) FOR EACH PRODUCT | | | |
|---|---|---|---|---|---|
| | | X | Y | Z | |
| FIRST PROCESSING APPARATUS | A-011 | 0.05 | 0.05 | 0.05 | |
| FIRST PROCESSING APPARATUS | A-012 | 0.10 | 0.10 | 0.10 | |
| SECOND PROCESSING APPARATUS | B-011 | 0.10 | 0.20 | 0.30 | |
| SECOND PROCESSING APPARATUS | B-012 | 0.15 | 0.30 | 0.45 | |
| THIRD PROCESSING APPARATUS | C-011 | 0.10 | 0.20 | 0.30 | |
| FOURTH PROCESSING APPARATUS | D-011 | 0.20 | 0.40 | 0.60 | |
| FIFTH PROCESSING APPARATUS | E-011 | 0.10 | 0.10 | 0.10 | |
| FIFTH PROCESSING APPARATUS | E-012 | 1.20 | 1.20 | 1.20 | |
| SIXTH PROCESSING APPARATUS | F-011 | 1.50 | 1.50 | 3.00 | |
| SIXTH PROCESSING APPARATUS | F-012 | 1.20 | 1.20 | 2.40 | |
| | | | | | |
| | | | | | |

154c    154d    154e

| PRODUCT NAME / SPECIFICATION ITEM | X | Y | Z | |
|---|---|---|---|---|
| NUMBER OF SURFACE-MOUNTED COMPONENTS | 100 | 200 | 300 | |
| AREA (cm²) | 50 | 50 | 100 | |
| NUMBER OF LAYERS | 4 | 4 | 8 | |
| | | | | |

154p

154q — NUMBER OF SURFACE-MOUNTED COMPONENTS
154r — AREA (cm²)
154s — NUMBER OF LAYERS

154t [REGISTRATION]

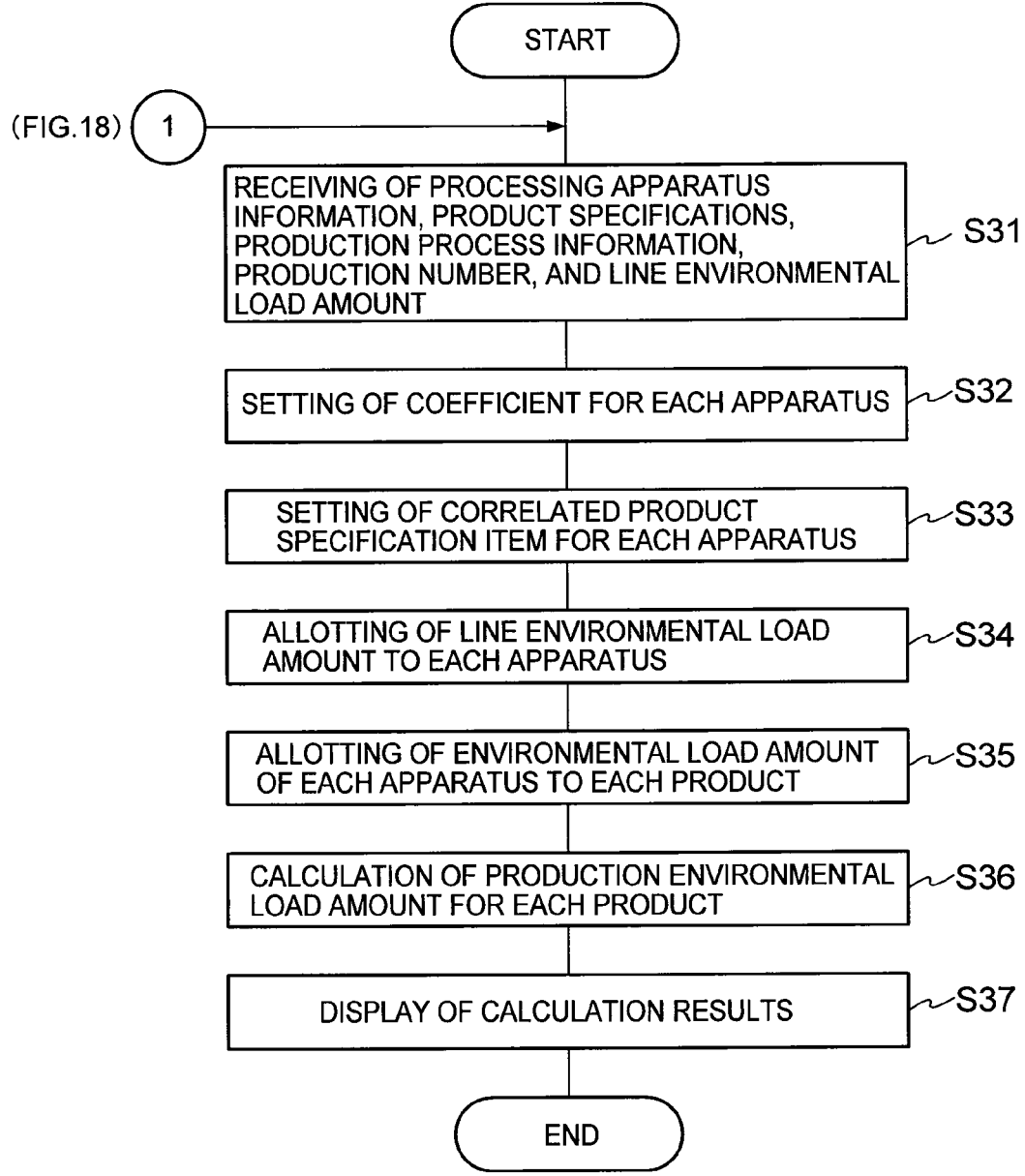

FIG. 16

PRODUCT ENVIRONMENTAL LOAD AMOUNT CALCULATION DATA INPUT SCREEN

PLEASE INPUT DATA IN EACH ITEM
(PLEASE INPUT DATA IN EACH ITEM OF PRODUCT SPECIFICATIONS AND NUMBER-OF-PASSAGES-OF-PRODUCT ITEM).

| OBJECT OF MEASUREMENT | POWER CONSUMPTION (Kwh/DAY) |
|---|---|
| LINE AS A WHOLE | 1500 |

| APPARATUS ID | PROCESSING APPARATUS NAME | MODEL NUMBER | RATED POWER CONSUMPTION (Kw) | ACTUAL POWER CONSUMPTION (Kw) | MAIN POWER CONSUMING MODULE | OPERATION PATTERN | PROCESSING TYPE | PROCESSING TIME | NUMBER OF PASSAGES OF PRODUCT A | B | C | (D) |
|---|---|---|---|---|---|---|---|---|---|---|---|---|
| 001 | FIRST PROCESSING APPARATUS | A-001 | 10 | | MOTOR | INTERMITTENT | COMPONENT MOUNTING | CONSTANT | 1 | 2 | 1 | (1) |
| 002 | SECOND PROCESSING APPARATUS | B-001 | 20 | | MOTOR | INTERMITTENT | COMPONENT MOUNTING | DIFFERENT | 1 | 2 | 0 | (1) |
| 003 | SECOND PROCESSING APPARATUS | B-002 | 13 | | MOTOR | INTERMITTENT | COMPONENT MOUNTING | DIFFERENT | 0 | 0 | 0 | (0) |
| 004 | THIRD PROCESSING APPARATUS | C-001 | 16 | | MOTOR | INTERMITTENT | TEST | DIFFERENT | 1 | 2 | 1 | (1) |
| 005 | FOURTH PROCESSING APPARATUS | D-001 | 16 | | MOTOR | INTERMITTENT | TEST | DIFFERENT | 1 | 1 | 1 | (1) |
| 006 | FIFTH PROCESSING APPARATUS | E-001 | 40 | | HEATER | STEADY | WARMING | CONSTANT | 1 | 2 | 1 | (1) |
| 007 | SIXTH PROCESSING APPARATUS | F-001 | 48 | 600 | HEATER | STEADY | COMPONENT MOUNTING | DIFFERENT | 1 | 1 | 1 | (1) |

| SPECIFICATION ITEM \ PRODUCT NAME | A | B | C | (D) |
|---|---|---|---|---|
| PRODUCTION NUMBER | 200 | 200 | 100 | (−) |
| NUMBER OF SURFACE-MOUNTED COMPONENTS | 100 | 200 | 300 | (400) |
| AREA (cm²) | 50 | 50 | 100 | (100) |
| NUMBER OF LAYERS | 4 | 4 | 8 | (4) |

REGISTRATION

FIG. 17

CALCULATION RESULT OUTPUT SCREEN — 155

ENVIRONMENTAL LOAD AMOUNT OF PROCESSING APPARATUS — 156

| APPARATUS ID | PROCESSING APPARATUS NAME | MODEL NUMBER | PROCESSING APPARATUS POWER CONSUMPTION (Kwh) |
|---|---|---|---|
| 001 | FIRST PROCESSING APPARATUS | A-001 | 50 |
| 002 | SECOND PROCESSING APPARATUS | B-001 | 150 |
| 003 | SECOND PROCESSING APPARATUS | B-002 | 100 |
| 004 | THIRD PROCESSING APPARATUS | C-001 | 100 |
| 005 | FOURTH PROCESSING APPARATUS | D-001 | 100 |
| 006 | FIFTH PROCESSING APPARATUS | E-001 | 400 |
| 007 | SIXTH PROCESSING APPARATUS | F-001 | 600 |
| | | TOTAL | 1500 |

Rows 001–007: 156a; TOTAL row: 156b

ENVIRONMENTAL LOAD AMOUNT OF PRODUCT — 157

| APPARATUS ID | PROCESSING APPARATUS NAME | MODEL NUMBER | PRODUCTION POWER CONSUMPTION (Kwh/UNIT) FOR EACH PRODUCT | | |
|---|---|---|---|---|---|
| | | | A | B | C |
| 001 | FIRST PROCESSING APPARATUS | A-001 | 0.07 | 0.14 | 0.07 |
| 002 | SECOND PROCESSING APPARATUS | B-001 | 0.15 | 0.60 | 0.00 |
| 003 | SECOND PROCESSING APPARATUS | B-002 | 0.00 | 0.00 | 1.00 |
| 004 | THIRD PROCESSING APPARATUS | C-001 | 0.09 | 0.31 | 0.23 |
| 005 | FOURTH PROCESSING APPARATUS | D-001 | 0.11 | 0.22 | 0.33 |
| 006 | FIFTH PROCESSING APPARATUS | E-001 | 0.57 | 0.14 | 0.57 |
| 007 | SIXTH PROCESSING APPARATUS | F-001 | 1.00 | 1.00 | 2.00 |
| | | TOTAL | 1.98 | 3.24 | 4.21 |

Rows 001–007: 157a; TOTAL row: 157b

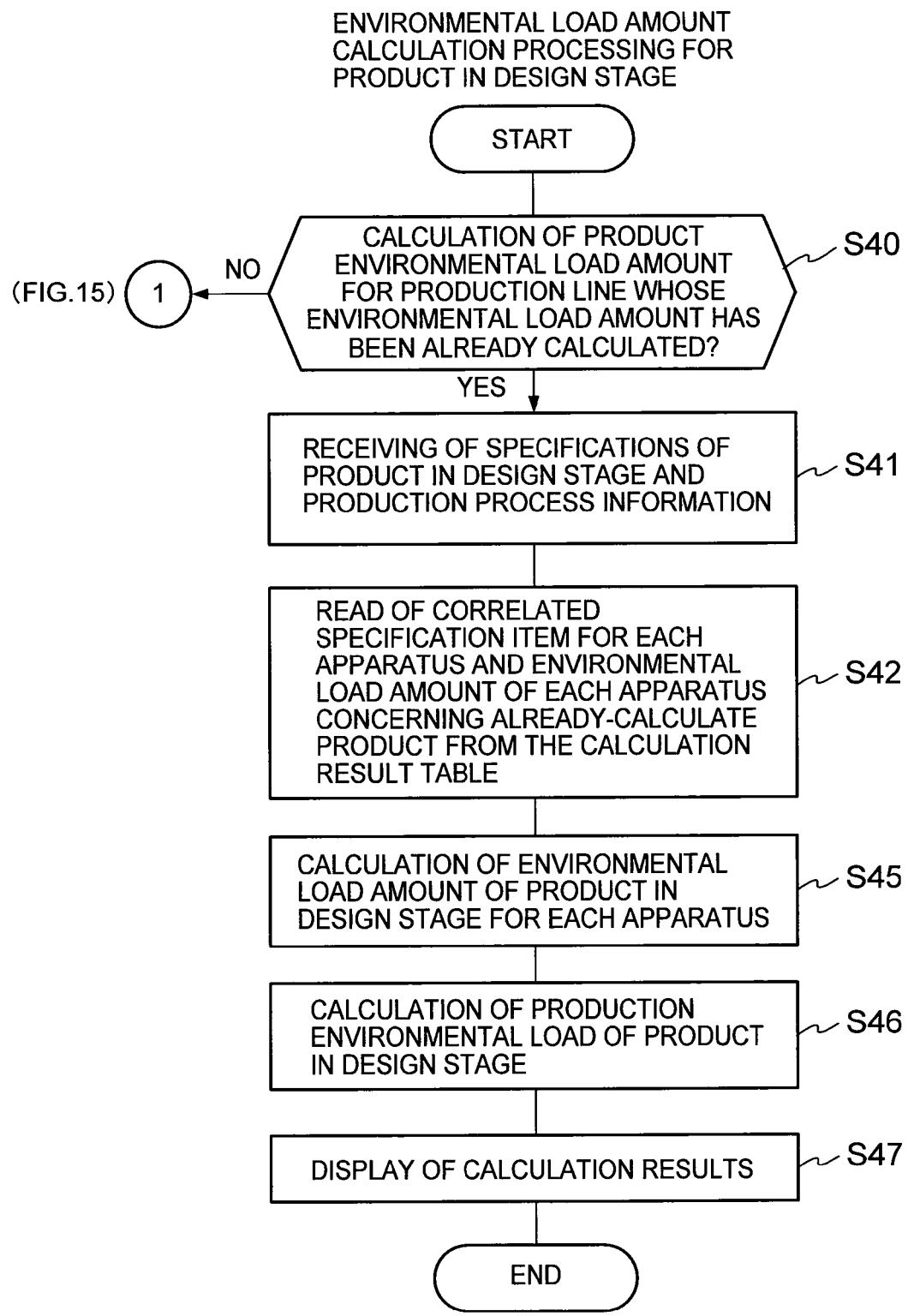

FIG. 19

CALCULATION RESULT OUTPUT SCREEN

ENVIRONMENTAL LOAD AMOUNT OF PRODUCT

| APPARATUS ID | PROCESSING APPARATUS NAME | MODEL NUMBER | PRODUCTION POWER CONSUMPTION (Kwh/UNIT) FOR EACH PRODUCT | | | |
|---|---|---|---|---|---|---|
| | | | A | B | C | D |
| 001 | FIRST PROCESSING APPARATUS | A-001 | 0.07 | 0.14 | 0.07 | 0.07 |
| 002 | SECOND PROCESSING APPARATUS | B-001 | 0.15 | 0.60 | 0.00 | 0.60 |
| 003 | SECOND PROCESSING APPARATUS | B-002 | 0.00 | 0.00 | 1.00 | 0.00 |
| 004 | THIRD PROCESSING APPARATUS | C-001 | 0.09 | 0.31 | 0.23 | 0.32 |
| 005 | FOURTH PROCESSING APPARATUS | D-001 | 0.11 | 0.22 | 0.33 | 0.44 |
| 006 | FIFTH PROCESSING APPARATUS | E-001 | 0.57 | 0.14 | 0.57 | 0.57 |
| 007 | SIXTH PROCESSING APPARATUS | F-001 | 1.00 | 1.00 | 2.00 | 2.00 |
| | | TOTAL | 1.98 | 3.24 | 4.21 | 4.00 |

ENVIRONMENTAL LOAD AMOUNT CALCULATION METHOD, EXECUTION PROGRAM THEREFOR, AND EXECUTION APPARATUS THEREFOR

CLAIM OF PRIORITY

The present application claims priority from Japanese application JP 2008-269129 filed on Oct. 17, 2008, the contents of which are hereby incorporated by reference into this application.

BACKGROUND OF THE INVENTION

The present invention relates to a technique of calculating an environmental load amount of each product produced through a production line.

Conventionally, for the purpose of improving products, a manufacturer calculates an amount of an environmental load of each product. For example, power consumption required for producing a product is calculated.

As a method of obtaining such an amount of an environmental load of each product, there are methods exemplified by the method called Life Cycle Assessment (LCA) in which an amount of an environmental load of a product is evaluated over the whole product life cycle ranging from material production, through product manufacturing, to product disposal, and a method disclosed in Japanese Unexamined Patent Laid-Open No. H08-235245 (hereinafter, simply referred to as the document).

According to LCA, an amount of an environmental load of a production line as a whole is allotted to each product according to a ratio of production volumes or production values, to obtain an amount of an environmental load of each product.

According to the method disclosed in the document, each time when production of any lot among a plurality of lots is finished, the actual production volume of each product produced during the interval between that time and the previous time and the total actual amount of environmental load required for producing each lot in that interval is obtained, and then an amount of an environmental load per one unit of product of each lot produced is calculated on the basis of the obtained values. This operation is repeated to obtain fine values.

SUMMARY OF THE INVENTION

The LCA method, however, cannot reflect a difference in amount of environmental load owing to difference in specifications of products. Thus, there is a good possibility that calculated results deviate from actual amount of environmental load.

Further, although the method disclosed in the document is very accurate because an amount of an environmental load of a product is obtained after the production line starts producing the product and after a certain volume of product has been produced, this method takes time between the start of the production line and the calculation. If it takes time between the start of production of a product and calculation of environmental load amount of the product, there may be the following problem. That is to say, for example in the case where the life cycle of the product is short and design of the next version product should be started at a time point when the production of the product is started, then the product design of the next version cannot use information on the amount of the environmental load of the product whose production has been just started.

Thus, the present invention has been made, taking this problem of the conventional technique into consideration. And, an object of the present invention is to provide a technique that can obtain amount of environmental load more accurately than LCA and calculate amount of environmental load earlier than the method described in the document.

To solve the above problems, the present invention provides an amount of an environmental load calculation program that calculates an amount of an environmental load of each of kinds of products produced in an object production line that comprises kinds of processing apparatuses.

First, according to the present invention, for each of kinds of processing apparatus characteristics, an apparatus characteristic-coefficient relation that indicates a relation between the processing apparatus characteristic in question and a coefficient indicating a ratio of an actual environmental load to a rated value of environmental load of a processing apparatus is acquired and stored in a storage unit of a computer, and then, for each of the kinds of processing apparatus characteristics, an apparatus characteristic-correlated specification item relation that relates the processing apparatus characteristic in question and a specification item having prescribed correlation with an amount of an environmental load of a processing apparatus among a plurality of product specification items is acquired and stored in the storage unit.

Next, a receiving means of the computer receives: an amount of a line environmental load as an actual amount of environmental load for a prescribed period in the object production line; processing apparatus characteristics of each of the kinds of processing apparatuses constituting the object production line; a rated value of environmental load of each of the kinds of processing apparatuses constituting the object production line; and numerical data of each specification item for each of the kinds of products produced in the object production line.

When the computer receives these data, the computer determines, for each of the kinds of processing apparatuses constituting the object production line, a coefficient corresponding to the apparatus characteristic (which has been previously received) of the processing apparatus by using the apparatus characteristic-coefficient relation (which is stored in the storing unit) for each of the kinds of processing characteristics; and obtains an apparatus load of each processing apparatus by using the rated value of environmental load and the coefficient for each of the kinds of processing apparatuses constituting the object production line in order to allot the previously-received amount of line environmental load to each processing apparatus.

Further, for each of the kinds of processing apparatuses constituting the object production line, a product correlated specification item corresponding to the apparatus characteristic (which has been previously received) of the processing apparatus is determined by using the apparatus characteristic-correlated specification item relation (which is stored in the storage unit) for each of the kinds of processing apparatuses; and by using numerical data of each product concerning the correlated specification item determined for each of the kinds of processing apparatuses constituting the object production line among the numerical data (which have been previously received) of the specification items of each of the kinds of products, the apparatus load (which has been previously obtained) for each processing apparatus is allotted to each product on a basis of correlation between the numerical data of each product and an apparatus load required for processing that product, in order to obtain a product load for each product and for each of the kinds of processing apparatus.

Then, the product load for each apparatus and for each product is used to obtain an amount of a production environmental load required for producing a product in the object production line for each product, and the obtained amount of the production environmental load for each product is stored in the storage unit.

In the above, the amount of the environmental load means energy consumption affecting the environment or emission of substance affecting the environment such as power consumption, gas consumption, water consumption, carbon dioxide emission, or the like. Further, an environmental load means an amount of an environmental load per unit of time. Thus, when an amount of an environmental load is power consumption, an environmental load is power consumption per unit of time.

According to the present invention, amount of environmental load of each product produced in an object (target) production line is estimated by using actually-achieved data of processing apparatuses similar to kinds of processing apparatuses constituting the object production line. As a result, it is possible to estimate amount of environmental load of each product in an earlier stage. Further, the present invention considers amount of environmental load of processing apparatuses depending on product specifications. Thus, it is possible to estimate amount of environmental load of each product more accurately.

BRIEF DESCRIPTION OF THE DRAWINGS

FIG. 2 is an explanatory diagram showing an arrangement of target production lines and relations between the target production lines and products in an embodiment of the present invention;

FIG. 3 is an explanatory diagram showing data structure of an apparatus characteristic-coefficient relation table in an embodiment of the present invention;

FIG. 4 is an explanatory diagram showing data structure of an apparatus characteristic-correlated specification item relation table in an embodiment of the present invention;

FIG. 5 is an explanatory diagram showing data structure of a processing apparatus information table in an embodiment of the present invention;

FIG. 6 is an explanatory diagram showing data structure of a product specification table in an embodiment of the present invention;

FIG. 7 is an explanatory diagram showing data structure of a production process information table in an embodiment of the present invention;

FIG. 8 is an explanatory diagram showing data structure of a production number information table in an embodiment of the present invention;

FIG. 9 is an explanatory diagram showing data structure of a line environmental load amount table in an embodiment of the present invention;

FIG. 10 is an explanatory diagram showing data structure of a calculation result table in an embodiment of the present invention;

FIG. 12 is an explanatory view showing a data input screen for acquiring a first relation in an embodiment of the present invention;

FIG. 13 is a flowchart showing a procedure of a second relation acquisition process in an embodiment of the present invention;

FIG. 14 is an explanatory view showing a data input screen for acquiring a second relation in an embodiment of the present invention;

FIG. 15 is a flowchart showing a procedure of a product environmental load amount calculation process in an embodiment of the present invention;

FIG. 16 is an explanatory view showing a data input screen for calculation of environmental loads amount of products in an embodiment of the present invention;

FIG. 17 is an explanatory view showing an output screen of calculation results in an embodiment of the present invention;

FIG. 18 is a flowchart showing a procedure of an environmental load amount calculation process for products in a design stage in an embodiment of the present invention; and FIG. 19 is an explanatory view showing an output screen of calculation results with respect to environmental loads amount of products in a design stage in an embodiment of the present invention.

DETAILED DESCRIPTION

Figure 1:
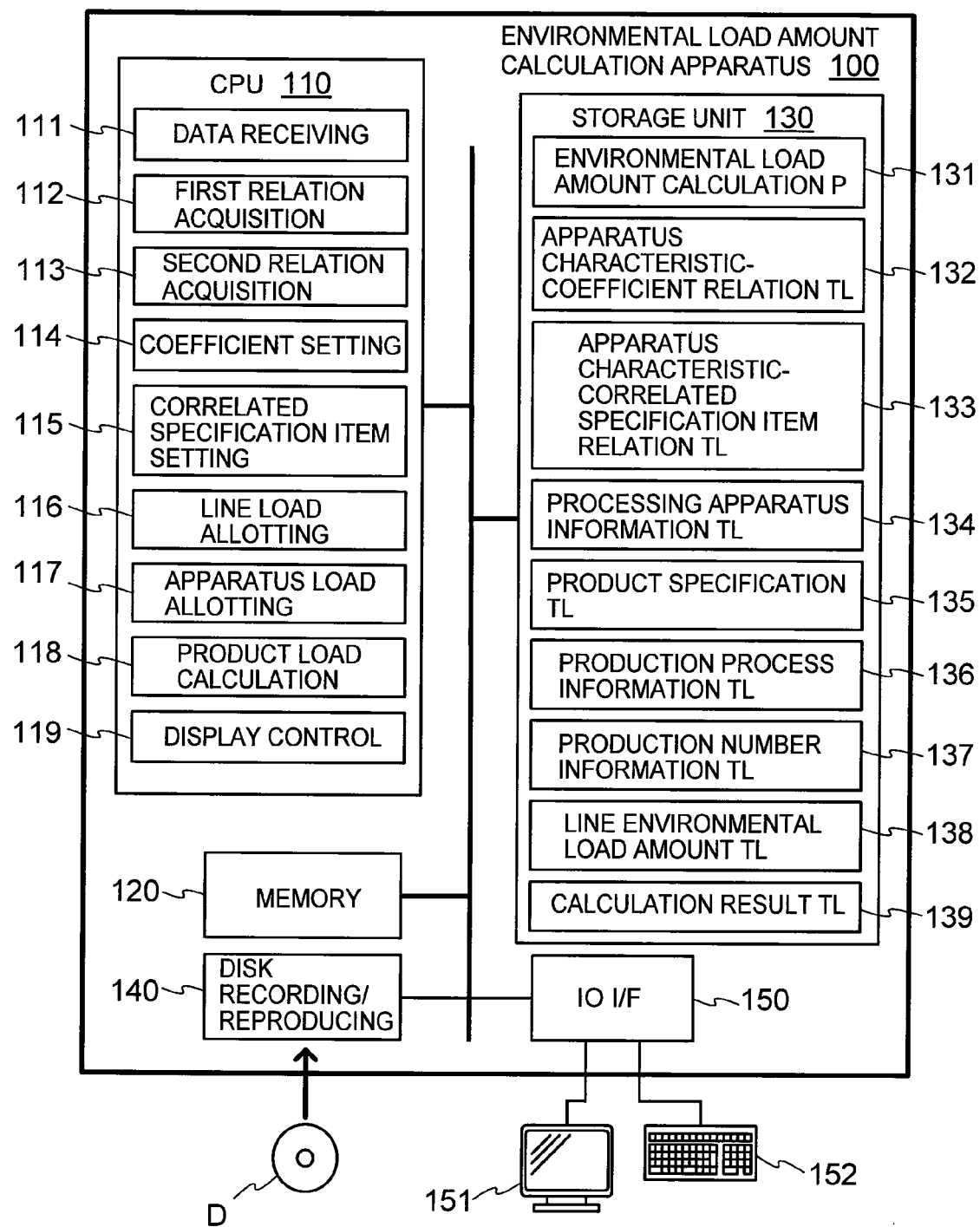
FIG. 1 is a block diagram showing an environmental load amount calculation apparatus according to an embodiment of the present invention.

Now, embodiments of environmental load amount calculation apparatus according to the present invention will be described referring to the drawings.

First, products whose amounts of environmental loads are calculated in an embodiment and a production line in which these products are manufactured will be simply described.

Products whose amounts of environmental loads are calculated in this embodiment are three types of circuit boards A, B and C having different specifications from one another. As shown in FIG. 2, a production line for manufacturing these circuit boards A, B and C comprises a first processing apparatus 1 having an apparatus ID "001", a second processing apparatus 2 having an apparatus ID "002", a second processing apparatus 3 having an apparatus ID "003", a third processing apparatus 4 having an apparatus ID "004", a fourth processing apparatus 5 having an apparatus ID "005", a fifth processing apparatus 6 having an apparatus ID "006", and a sixth processing apparatus 7 having an apparatus ID "007".

Among the circuit boards A, B and C, the circuit board A is manufactured not through the second processing apparatus 3 of the apparatus ID "003" but through the first processing apparatus 1 of the apparatus ID "001", the second processing apparatus 2 of the apparatus ID "002", the third processing apparatus 4 of the apparatus ID "004", the fourth processing apparatus 5 of the apparatus ID "005", the fifth processing apparatus 6 of the apparatus ID "006" and the sixth processing apparatus 7 of the apparatus ID "007" in this order. The circuit board B is manufactured through the first processing apparatus 1 of the apparatus ID "001", the second processing apparatus 2 of the apparatus ID "002", the third processing apparatus 4 of the apparatus ID "004", the fourth processing apparatus 5 of the apparatus ID "005", the fifth processing apparatus 6 of the apparatus ID "006", the first processing apparatus 1 of the apparatus ID "001", the second processing apparatus 2 of the apparatus ID "002", the third processing apparatus 4 of the apparatus ID "004", the fifth processing apparatus 6 of the apparatus ID "006" and the sixth processing apparatus 7 of the apparatus ID "007", in this order. That is to say, the circuit board B is manufactured through the second processing apparatus 2 of the apparatus ID "002", the third processing apparatus 4 of the apparatus ID "004" and the fifth processing apparatus 6 of the apparatus ID "006" each twice. And, the circuit board C is manufactured not through the second processing apparatus 2 of the apparatus ID "002" but through the first processing apparatus 1 of the apparatus ID "001", the second processing apparatus 3 of the apparatus ID "003", the third processing apparatus 4 of the apparatus ID "004", the fourth processing apparatus 5 of the apparatus ID "005", the fifth processing apparatus 6 of the apparatus ID "006" and the sixth processing apparatus 7 of the apparatus ID "007" in this order.

Next, a configuration of an environmental load amount calculation apparatus 100 of the present embodiment will be described referring to FIG. 1. The environmental load amount calculation apparatus 100 obtains power consumption as an amount of an environmental load of producing one unit of each above-mentioned product A, B, C through the production line.

The environmental load amount calculation apparatus 100 of the present embodiment is a computer that comprises: a CPU 110 for executing various operations; a memory 120 as a work area for the CPU 110; a storage unit 130 such as a hard disk drive; a disk recording/reproducing unit 140 for recording and reproducing data in a disk-type storage medium D; a display unit 151; an input unit 152 such as a keyboard or a mouse; and an IO interface 150 as an interface for the display unit 151 and the input unit 152.

Functionally, the CPU 110 comprises: a data receiving part 111 for receiving data from the outside; a first relation acquisition part 112 for acquiring an apparatus characteristic-coefficient relation (which is a relation between a processing apparatus characteristic and the below-mentioned coefficient) from actual past data; a second relation acquisition part 113 for acquiring an apparatus characteristic-correlated specification item relation (which relates apparatus characteristic and specification item correlated with the amount of the environmental load (power consumption) of the processing apparatus among a plurality of product specification items) from actual past data; a coefficient setting part 114 for setting a coefficient of each processing apparatus as a component of the production line by using the apparatus characteristic-coefficient relation; a correlated specification item setting part 115 for setting a correlated specification item for each processing apparatus as a component of the production line, by using the apparatus characteristic-correlated specification item relation; a line load allotting part 116 for obtaining power consumption of each processing apparatus by allotting actual power consumption of the production line as a whole to each processing apparatus; a product load allotting part 117 for allotting the power consumption of each processing apparatus to each product, so as to obtain power consumption required for processing each product in each processing apparatus; a product load calculation part 118 for obtaining power consumption required for manufacturing each product; and a display control part 119 for making the display unit 151 display calculation results of the product load calculation part 118.

The storage unit 130 previously stores an amount of an environmental load calculation program 131 for realizing the respective functions of the above-mentioned functional parts 111-119. Further, in the storage unit 130, are established through an execution process of the amount of environmental load calculation program 131: an apparatus characteristic-coefficient relation table 132 acquired by the first relation acquisition part 112; an apparatus characteristic-correlated specification item relation table 133 acquired by the second relation acquisition part 113; a processing apparatus information table 134 that indicates information on each processing apparatus as a component of the actual production line; a product specification table 135 that indicates information on specifications of each actually-produced product; a production process information table 136 that indicates which processing apparatus in the production line works for manufacturing each product; a production number information table 137 that indicates the production number of each product produced in the actual production line; a line environmental load amount table 138 that indicates power consumption and the like of the actual production line as a whole; and a calculation result table 139 that indicates calculation results of the production load calculation part 118 and the like. In storing the environmental load amount calculation program 131 in the storage unit 130, the program 131 may be acquired by reproducing a disk-type storage medium D that records the program 131 through the disk recording/reproducing unit 140. Or, the program may be acquired from an external system or the like through a communication unit.

The apparatus characteristic-coefficient relation table 132 is generated on the basis of actual past data in a preliminary stage for obtaining power consumption of each product. As shown in FIG. 3, the apparatus characteristic-coefficient relation table 132 has: a category field 132*a* for storing a category of an apparatus concerning a coefficient; a coefficient field 132*b* for storing a coefficient of an apparatus belonging to the category in question; a processing apparatus name field 132*c* for storing a name of an apparatus belonging to the category; a model number field 132*d* for storing a model number of the apparatus; a main power consuming module field 132*e* for storing a name of a main power consuming module of the processing apparatus; an operation pattern field 132*f* for storing an operation pattern of the main power consuming module; a processing type field 132*g* for storing a type of processing performed by the processing apparatus; a processing time field 132*h* for storing whether respective processing times of kinds of products processed by the processing apparatus are constant or different; a rated power field 132*i* for storing a rated electric power of the processing apparatus; an actual power consumption field 132*j* for storing an actual power consumption of the processing apparatus; and a ratio field 132*k* for storing a ratio of the actual power consumption to the rated power of the processing apparatus. Here, a coefficient stored in the coefficient field 132*b* is an average value of the above-mentioned ratios concerning processing apparatuses of the same category.

Similarly to the apparatus characteristic-coefficient relation table 132, the apparatus characteristic-correlated specification item relation table 133 is generated on the basis of the actual past data in the preliminary stage for obtaining power consumption of each product. As shown in FIG. 4, the apparatus characteristic-correlated specification item relation table 133 has: a category field 133*a* for storing a category of an apparatus concerning a correlated specification item; a correlated specification item field 133*b* for storing a correlated specification item of a product in the category; a processing apparatus name field 133*c* for storing a name of an apparatus belonging to the category; a model number field 133*d* for storing a model number of the apparatus; a main power consuming module field 133*e* for storing a name of a main power consuming module of the processing apparatus; an operation pattern field 133*f* for storing an operation pattern of the main power consuming module; a processing type field 133*g* for storing a type of processing performed by the processing apparatus; and a processing time field 133*h* for storing whether respective processing times of kinds of products processed by the processing apparatus are constant or different.

As shown in FIG. 5, the processing apparatus information table 134 has: an ID field 134*a* for storing an ID of each processing apparatus as a component of the actual production line; a processing apparatus name field 134c for storing a name of an apparatus having the ID; a model number field 134d for storing a model number of the processing apparatus; a main power consuming module field 134e for storing a name of main power consuming module of the processing apparatus; an operation pattern field 134f for storing an operation pattern of the main power consuming module; a processing type field 134g for storing a type of processing performed by the processing apparatus; and a processing time field 134h for storing whether respective processing times of kinds of products processed by the processing apparatus are constant or different.

As shown in FIG. 6, the product specification table 135 has: a product name field 135p for storing a name of a product produced actually in the production line; a number-of-surface-mounted-components field 135q for storing the number of surface-mounted components of each product; an field 135r for storing an area of a component mounting field in each product; and a number-of-layers field 135s for storing the number of layers in each product. Here, the number of surface-mounted components, the area of the component mounting field, and the number of layers are all included in the specifications of a board as a product.

As shown in FIG. 7, the production process information table 136 has: an apparatus ID field 136a for storing an ID of each processing apparatus as a component of the actual production line; and a number of passages of the product field 136b for storing the number of times processing is performed in the processing apparatus until completion of each product.

As shown in FIG. 8, the production number information table 137 has: a product name field 137a for storing a name of product produced actually in the production line; and a production number field 137b for storing the production number per day of each product.

As shown in FIG. 9, the line environmental load amount table 138 has: a measured object field 138m for storing a name or an ID of an object whose power consumption is actually measured; and a power consumption field 138n for storing an actual power consumption per day of the object. This table 138 should store an actual power consumption per day of at least the object production line.

As shown in FIG. 10, the calculation result table 139 has: an ID field 139a for storing an ID of each processing apparatus as a component of the actual production line; a processing apparatus name field 139c for storing a name of an apparatus having the ID; a model number field 139d for storing a model number of the processing apparatus; a coefficient field 139e for storing a coefficient of the processing apparatus; a correlated specification item field 139f for storing a correlated product specification item of the processing apparatus; an field 139g for storing a power consumption per day of the apparatus; an field 139h for storing a power consumption for producing one unit of each product; and an field 139i for storing a total sum of power consumptions stored in the field 139g and total sums of power consumptions stored in the field 139h.

Next, operation of the environmental load amount calculation apparatus 100 of the present embodiment will be described.

As the preliminary stage for processing of obtaining a power consumption (i.e. amount of environmental load) of each product, the environmental load amount calculation apparatus 100 performs processing of acquiring an apparatus characteristic-coefficient relation (a first relation) and a product specification-amount of load relation (a second relation).

Figure 11:
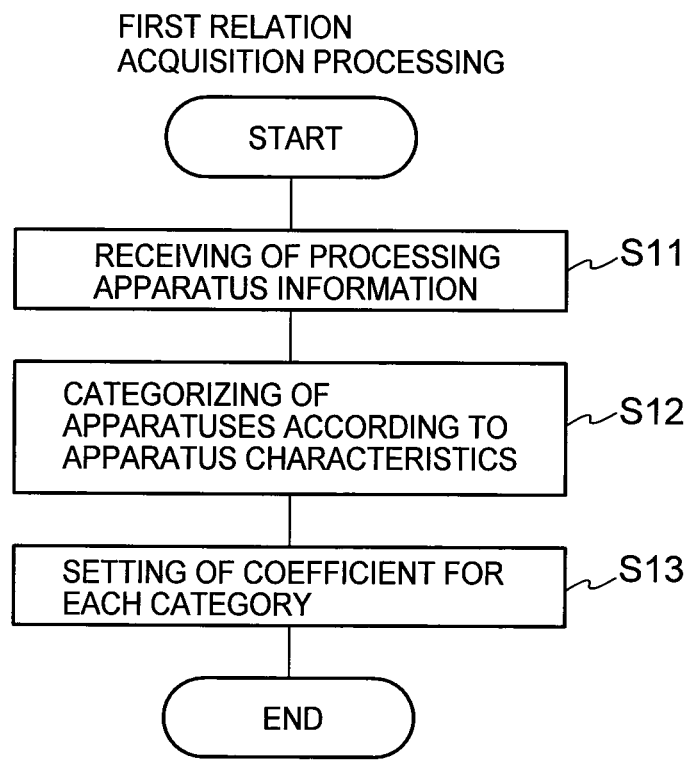
FIG. 11 is a flowchart showing a procedure of a first relation acquisition process in an embodiment of the present invention.

First, the first relation acquisition processing will be described referring to the flowchart shown in FIG. 11.

When the data receiving part 111 receives an instruction to perform the first relation acquisition processing from the input unit 152, the data receiving part 111 causes a first relation acquisition data input screen 153 (such as shown in FIG. 12) to be displayed through the display control part 119, to receive various kinds of information on processing apparatuses shown in the data input screen (S11).

This data input screen 153 has, as its input items: a processing apparatus name item 153c for inputting a name of an apparatus; a model number item 153d for inputting a model number of the processing apparatus; a main power consuming module item 153e for inputting a name of a main power consuming module of the processing apparatus; an operation pattern item 153f for inputting an operation pattern of the main power consuming module; a processing type item 153g for inputting a type of processing performed by the processing apparatus; a processing time item 153h for inputting whether respective processing times of products processed by the processing apparatus are constant or different; a rated power item 153i for inputting a rated electric power of the processing apparatus; and an actual power consumption item 153j for inputting an actual power consumption of the processing apparatus. The data receiving part 111 receives these input items 153c-153j. For example, the data receiving part 111 receives "first processing apparatus" as the processing apparatus name item 153c, "A-001" as the model number item 153d, "motor" as the main power consuming module item 153e, "intermittent" as the operation pattern item 153f, "component mounting" as the processing type item 153g, "constant" as the processing time item 153h, "12" as the rated power item 153i, and "2.3" as the actual power consumption item 153j.

Here, as data inputted in the operation pattern item 153f, there are two kinds, i.e. "intermittent" meaning that operation is stopped each time a task is finished, and "steady" meaning operation is performed steadily regardless of whether a task is under operation or not once the processing apparatus is started. As data inputted in the processing type item 153g, there are three kinds, i.e. "component mounting", "test" and "warming". And, as data inputted in the processing time item 153h, there are two kinds, i.e. "constant" meaning that respective processing times of kinds of products processed by a processing apparatus are same and "different" meaning that processing times are different between kinds of products.

Data of these input items 153c-153j may be actual data on a processing apparatus as a component of the object production line described referring to FIG. 2. Basically, however, these data are actual data on a processing apparatus as a component of another past or present production line. When a registration button 153t in the data input screen 153 is pushed, the data receiving part 111 stores respective pieces of data of the above input items 153c-153j into the corresponding fields 132d-132j of the apparatus characteristic-coefficient relation table 132 (FIG. 3) in the storage unit 130.

Next, the first relation acquisition part 112 classifies in categories a plurality of processing apparatuses indicated by the received apparatus information, on the basis of their apparatus characteristics (S12). Among the input items in the data input screen 153 shown in FIG. 12, the apparatus characteristics items used here are the main power consuming module item 153e, the operation pattern item 153f, the processing type item 153g, and the processing time item 153h. The first relation acquisition part 112 classifies apparatuses having the same data with respect to all these input items 153e-153h as the same category. For example, in the data input screen 153 shown in FIG. 12, both the processing apparatuses of the model number items 153d "A-011" and "A-012" have the same apparatus characteristics, namely, the main power consuming module item 153e "motor", the operation pattern item 153f "intermittent", the processing type item 153g "component mounting", and the processing time item 153h "constant". Thus, these apparatuses are classified in the same category. As a result, the first relation acquisition part 112 gives, for example, "1" as a category number to both the processing apparatuses of the model number items 153d "A-011" and "A-012", and stores "1" in the respective category fields 132a in the records storing "A-011" and "A-012" in their model number fields 132d in the apparatus characteristic-coefficient relation table 132 shown in FIG. 3. The first relation acquisition part 112 performs the above-described processing with respect to the processing apparatuses of all model numbers received in the step S11.

Next, the first relation acquisition part 112 obtains a ratio of the actual power consumption to the rated power for each processing apparatus, stores the obtained ratio in the ratio field 132k of the apparatus characteristic-coefficient relation table 132 (FIG. 3), obtains the average value of the ratios of the apparatuses in each category, and stores, as a coefficient for the processing apparatuses of the category in question, the obtained average value in the coefficient field 132b of the apparatus characteristic-coefficient relation table 132 (S13). For example, the first relation acquisition part 112 obtains ratios "0.19" and "0.21" of the actual power consumption to the rated power with respect to the processing apparatuses "A-011" and "A-012" in the category "1" respectively, and stores these ratios "0.19" and "0.21" in the corresponding ratio fields 132k of the apparatus characteristic-coefficient relation table 132. Next, the first relation acquisition part 112 obtains the average value "0.20" of these ratios "0.19" and "0.21" for the processing apparatuses "A-011" and "A-012" in the category "1", and stores this average value, as a coefficient for the processing apparatuses in the category in question, in the coefficient field 132b of the apparatus characteristic-coefficient relation table 132. The first relation acquisition part 112 performs the above-described processing for the processing apparatus of all model numbers received in the step S11.

Thus, the first relation acquisition processing is finished.

Next, the second relation acquisition processing will be described referring to the flowchart shown in FIG. 13.

When the data receiving part 111 receives an instruction to perform the second relation acquisition processing from the input unit 152, the data receiving part 111 causes a second relation acquisition data input screen 154 (such as shown in FIG. 14) to be displayed through the display control part 119, to receive various kinds of information on processing apparatuses and various kinds of information on products shown in the data input screen (S21).

As input items concerning various kinds of information on a processing apparatus, the data input screen 154 has: a processing apparatus name item 154c for inputting an apparatus name of a processing apparatus that has been actually a component of another production line; a model number item 154d for inputting a model number of the processing apparatus; and a power-consumption-for-each-product item 154e for inputting an actual power consumption of the processing apparatus for producing per day of each product. Further, as input items concerning various kinds of information on a product, the data input screen 154 has: a product name item 154p for inputting a name of a product that has been actually produced in another production line; a number-of-surface-mounted-components item 154q for inputting the number of surface-mounted components of each product; an area item 154r for inputting an area of a component mounting field of each product; and a number-of-layers item 154s for inputting the number of layers of each product. The data receiving part 111 receives these input items 154c-154e and 154p-154s. For example, as for the input items concerning the various kinds of information on processing apparatus, the data receiving part 111 receives "first processing apparatus" as the processing apparatus name item 154c, "A-001" as the model number item 154d, and "0.05", "0.05" and "0.05" as power-consumption-for-each-product items 154e respectively for products X, Y and Z. And, for example, as for the input items concerning various kinds of information on product, the data receiving part 111 receives "X" as the product name item 154p, "100" as the number-of-surface-mounted-components item 154q for the product "X", "50" as the square measure item 154r for the product "X", and "4" as the number-of-layers item 154s for the product "X". Data of these input items 154c-154e and 154p-154s may be actual data on a processing apparatus as a component of the object production line described referring to FIG. 2 and actual data on a product produced through that production line. Basically, however, these data are actual data on a processing apparatus as a component of another past or present production line and actual data on a product produced through that production line. When a registration button 154t in the data input screen 154 is pushed, the data receiving part 111 stores, among the data of the above input items 154c-154e and 154p-154s, the data of the processing apparatus name item 154c and the data of the model number item 154d into the corresponding fields 133c and 133d of the apparatus characteristic-correlated specification item relation table 133 (FIG. 4) in the storage unit 130.

Next, the second relation acquisition part 113 compares the actual power consumption received in the step S21 for each processing apparatus and for each product and the product specifications received in the step S21 for each product, to extract a product specification item correlated with an actual power consumption of each processing apparatus (S22). For example, in the case where attention is focused on the actual power consumption of each product concerning the processing apparatus name item 154c "second processing apparatus" and the model number item 154d "B-011" in the input screen 154 shown in FIG. 14, the ratio of the actual power consumption of processing of the product "X":the actual power consumption of processing of the product "Y":the actual power consumption of processing of the product "Z" is 1:2:3. Accordingly, the second relation acquisition part 113 judges that the actual power consumption of the second processing apparatus "B-011" is correlated with the number of surface-mounted components among the product specifications, and stores "number of surface-mounted components" into the correlated specification item field 133d corresponding to the processing apparatus in question in the apparatus characteristic-correlated specification item relation table 133 (FIG. 4). Further, in the case where attention is focused on the actual power consumption of each product concerning the processing apparatus name item 154c "first processing apparatus" and the model number item 154d "A-011" in the input screen 154 shown in FIG. 14, the ratio of the actual power consumption of processing of the product "X":the actual power consumption of processing of the product "Y":the actual power consumption of processing of the product "Z" is 1:1:1. On the other hand, there is no item for which the ratio of the specification of the product "X":the specification of the product "Y":the specification of the product "Z" becomes 1:1:1 among the product specification items. Accordingly, the second relation acquisition part 113 judges that the actual power consumption of the first processing apparatus "A-011" is not correlated with any of the product specification items, and stores "none" into the correlated specification item field 133*d* corresponding to the processing apparatus in question in the apparatus characteristic-correlated specification item relation table 133 (FIG. 4).

Next, the second relation acquisition part 113 classifies in categories a plurality of processing apparatuses indicated by the received apparatus information, on the basis of the correlated specification items, and stores data in the blank fields of the apparatus characteristic-correlated specification item relation table 133 (FIG. 4) (S23). For example, since the correlated specification item of the second processing apparatus "B-011" and the correlated specification item of the second processing apparatus "B-012" are both "number of surface-mounted components", it is judged that these apparatuses belong to the same category. Thus, the second relation acquisition part 113 stores, for example, "2" into the category field 133*a* corresponding to these processing apparatuses in the apparatus characteristic-correlated specification item relation table 133 (FIG. 4). Further, the second relation acquisition part 113 obtains the apparatus characteristics of these processing apparatuses from the apparatus characteristic-coefficient relation table 132 (FIG. 3), and stores the obtained apparatus characteristics into the apparatus characteristic fields 133*e*-133*h* corresponding to the processing apparatuses in question in the apparatus characteristic-correlated specification item relation table 133 (FIG. 4). Here, the data to be stored in the apparatus characteristic fields 133*e*-133*h* in the apparatus characteristic-correlated specification item relation table 133 (FIG. 4) are obtained from the apparatus characteristic-coefficient relation table 132 (FIG. 3). However, it is possible that these apparatus characteristics are received as processing apparatus information in the above-described step S21, and stored in the apparatus characteristic-correlated specification item relation table 133.

Thus, the second relation acquisition processing is finished.

In both the above-described first relation acquisition processing and second relation acquisition processing, the first or second relation acquisition part 112, 113 receives various kinds of data on a processing apparatus or a product through the data receiving part 111, and generates the table 132, 133 indicating the first or second relation on the basis of the received data. However, it is possible to arrange that the first relation acquisition part 112 and the second relation acquisition part 113 receive the tables 132 and 133 indicating the first relation and the second relation respectively from another system or the like.

Next, a product environmental load amount calculation process will be described referring to the flowchart shown in FIG. 15.

When the data receiving part 111 receives an instruction to perform the product environmental load amount calculation process from the input unit 152, the data receiving part 111 causes a load amount calculation data input screen 155 (such as shown in FIG. 16) to be displayed through the display control part 119, to receive various kinds of information on processing apparatuses and various kinds of information on products shown in the data input screen (S31). Differently from the receiving step S11 in FIG. 11 and the receiving step S21 in FIG. 13, the information received here is information on object products for which amounts of environmental loads are actually obtained, information on the object production line (shown in FIG. 2) through which the products in question are produced, information on processing apparatuses as components of the object production line, and the like.

As input items concerning various kinds of information on a processing apparatus, the data input screen 155 has: an apparatus ID item 155*a* for inputting an ID of a processing apparatus as an actual component of a production line for producing an object product for which an amount of an environmental load is to be obtained; a processing apparatus name item 155*c* for inputting a name of the apparatus; a model number item 155*d* for inputting a model number of the processing apparatus; a rated power item 155*i* for inputting a rated power of the processing apparatus; an actual power consumption item 155*j* for appropriately inputting an actual power consumption of the processing apparatus; a main power consuming module item 155*e* for inputting a name of a main power consuming module of the processing apparatus; an operation pattern item 155*f* for inputting an operation pattern of the main power consuming module; a processing type item 155*g* for inputting a processing type of the processing apparatus; a processing time item 155*h* for inputting whether respective processing times of kinds of products processed by the processing apparatus are constant or different; and a number-of-passages-of-product item 155*k* for inputting the number of passages of the product is performed in the processing apparatus until completion of each product.

Further, as input items concerning products, the data input screen 155 has: a product name item 155*p* for inputting a name of an object product; a production number item 155*u* for inputting the production number per day of each product; a number-of-surface-mounted-components item 155*q* for inputting the number of surface-mounted components of each product; a square measure item 155*r* for inputting an area of a component mounting field in each product; and a number-of-layers item 155*s* for inputting the number of layers in each product.

Further, as an input item, the data input screen 155 has an actual line power consumption item 155*n* for inputting an actual power consumption of the object production line as a whole.

Data and the like shown in parentheses in FIG. 16 are inputted when the processing of the flowchart shown in FIG. 18 is performed, and have nothing to do with the processing described here. Similarly, data and the like shown in parentheses in FIGS. 6, 7 and 10 are inputted when the processing of the flowchart shown in FIG. 18 is performed.

When a registration button 155*k* is pushed after the above-described input items are received, the receiving part 111 stores data concerning each input item into a corresponding table 134-138 in the storage unit 130.

In detail, the data receiving part 111 stores data of the input items 155*a*, 155*c*-155*i* concerning apparatus specifications and the like into the corresponding fields 134*a*, 134*c*-134*i* in the processing apparatus information table 134 shown in FIG. 5, and data of the input items 155*a* and 155*k* concerning production processes and the like into the corresponding fields 136*a* and 136*b* in the production process information table 136 shown in FIG. 7. The data stored in the production process information table 136 show contents of the production process (which has been described referring to FIG. 2) of each object product in the object product line. Further, when the data receiving part 111 receives data of the actual power consumption item 155*j* among the above-described input items, the data receiving part 111 stores the data, i.e. the actual power consumption, together with the apparatus ID into the line environmental load amount table 138 shown in FIG. 9. The data in question are not data that must be necessarily received in this receiving step S31, but the kind of data whose reception is favorable if an actual power consumption of any of the processing apparatuses constituting the object production line has been actually measured.

Among the input items concerning products, the data receiving part 111 stores the data of the product name item 155*p* and the product number item 155*u* into the production number information table 137 shown in FIG. 8, and the data of the product name item 155*p*, the number-of-surface-mounted-components item 155*q*, the square measure item 155*r* and the number-of-layers item 155*s* into the product specification table 135 shown in FIG. 6.

Further, the data receiving part 111 stores the data of the actual line power consumption item 155*n* into the record for the line as a whole in the line environmental load amount table 138 shown in FIG. 9.

Further, the data receiving part 111 stores the data of the apparatus ID item 155*a*, the apparatus name item 155*c* and the model number item 155*d* as input items concerning apparatuses into the corresponding fields 139*a*, 139*c* and 139*d* of the calculation result table 139 shown in FIG. 10.

Thus, the data receiving step S31 is finished.

Next, the coefficient setting part 114 determines coefficients of all the processing apparatuses constituting the object production line by referring to the processing apparatus information table 134 (FIG. 5) and the apparatus characteristic-coefficient relation (first relation) table 132 (FIG. 3), and stores the coefficients in the coefficient field 139*e* of the calculation result table 139 (FIG. 10) (S32). In detail, for example, in the case where a coefficient of the object processing apparatus "A-001" is to be set, the coefficient setting part 114 first refers to the processing apparatus information table 134, to grasp the apparatus characteristics of the processing apparatus "A-001". In this case, as the apparatus characteristics of the processing apparatus "A-001", the main power consuming module is "motor", the operation pattern "intermittent", the processing type "component mounting", and the processing time "constant". Next, among the categories of the apparatus categories in the apparatus characteristic-coefficient relation table 132, the apparatus category "1", i.e. the same characteristic as the apparatus characteristic of the processing apparatus "A-001", is selected. And, the coefficient "0.20" of the apparatus category "1" becomes the coefficient of the processing apparatus "A-001". This coefficient "0.20" is stored in the coefficient field 139*e* of the record of the apparatus in question in the calculation result table 139 (FIG. 10).

Next, the correlated specification item setting part 115 determines correlated specification items of all the processing apparatuses constituting the object production line by referring to the processing apparatus information table 134 (FIG. 5) and the apparatus characteristic-correlated specification item relation (second relation) table 133 (FIG. 4), and stores the correlated specification items in the correlated specification item field 139*f* of the calculation result table 139 (FIG. 10) (S33). In detail, for example in the case where a correlated specification item of the object processing apparatus "A-001" is to be set, the correlated specification item setting part 115 first refers to the processing apparatus information table 134, to grasp the apparatus characteristics of the processing apparatus "A-001". Next, the apparatus category "1", i.e. the same characteristic as the apparatus characteristic of the processing apparatus "A-001", is selected. Then, the correlated specification item "none" of this apparatus category "1" becomes the correlated specification item of the processing apparatus "A-001", and the correlated specification item "none" is stored in the correlated specification item field 139*f* of the record of the apparatus in question in the calculation result table 139 (FIG. 10).

Next, the line load allotting part 116 allots the power consumption per day (which is stored in the line environmental load amount table 138) of the production line as a whole to each processing apparatus by using the power consumption and the rated power of each processing apparatus as a component of the production line, and stores each result in the power consumption field 139*g* of the corresponding apparatus in the calculation result table 139 (FIG. 10) (S34).

For example, in the case where a power consumption per day of the object processing apparatus "A-001" is to be obtained, basically the power consumption per day of the production line as a whole is multiplied by the ratio of the power consumption of the object processing apparatus "A-001" to the power consumption of the production line as a whole, to obtain the power consumption per day of the object processing apparatus "A-001". In this case, a power consumption of each processing apparatus is obtained by multiplying the rated power of the processing apparatus by its coefficient (the ratio of the actual power consumption to the rated power). Further, in the case where there is a processing apparatus whose power consumption has been actually measured, the above calculation is performed by excluding the power consumption of that processing apparatus. In detail, as shown in the following, the line load allotting part 116 subtracts the already-measured power consumption of the processing apparatus in question from the power consumption of the production line as a whole, and multiplies the result value by the ratio of the power consumption of the object processing apparatus "A-001" to the total sum of the power consumptions of all the processing apparatuses as the objects of allotting the result value, to obtain a power consumption per day of the object processing apparatus "A-001".

$$\text{Power consumption of the object processing apparatus "}A\text{-}001\text{"} =$$

$$(\text{Power consumption of the production line as a whole} -$$

$$\text{the already-measured power consumption}$$

$$\text{of the processing apparatus in question}) *$$

$$(\text{rated power of "}A\text{-}001\text{"} * \text{coefficient of "}A\text{-}001\text{"}) /$$

$$\Sigma(\text{rated power of an apparatus as object of allotting} *$$

$$\text{coefficient of that apparatus}) =$$

$$(1500 - 600) * (10 * 0.20) / (10 * 0.20 + 20 * 0.30 + 13 * 0.30 +$$

$$16 * 0.25 + 16 * 0.25 + 40 * 0.40) = 50 \text{ (kWh)}$$

That is to say, the power consumption per day of the object processing apparatus "A-001" is obtained by using the power consumption per day of the production line as a whole and the power consumption per day of the already-measured processing apparatus stored in the line environmental load amount table 138, the coefficient of each processing apparatus stored in the calculation result table 139 (FIG. 10), and the rated power of each processing apparatus stored in the processing apparatus information table 134 (FIG. 5). The line load allotting part 116 stores the thus-obtained power consumption per day of the object processing apparatus "A-001" in the processing apparatus power consumption field 139*g* in the record of the object processing apparatus "A-001" in the calculation result table 139 (FIG. 10).

The line load allotting part 116 performs the above-described processing with respect to all the processing apparatuses constituting the object production line except for processing apparatuses whose power consumptions have been already measured. Here, the description has been given taking the example where a power consumption of one processing apparatus has been already measured. It goes without saying that power consumptions of more apparatuses may have been already measured, or a power consumption of no apparatus may have been already measured.

Next, the apparatus load allotting part 117 allots the amount of environmental load (i.e. power consumption) of each apparatus, obtained in the step S34, to each product on the basis of a value concerning the correlated specification item stored in the correlated specification item field 139f of the calculation result table 139 (FIG. 10), to obtain a power consumption required for processing of one unit of each product in each apparatus, and stores the obtained power consumption in the production power consumption field 139h for each product (S35).

In detail, for example in the case where a power consumption for each product in the object processing apparatus "A-001" is to be obtained, the correlated specification item of the processing apparatus "A-001" is "none". Thus, the apparatus load allotting part 117 assumes that power consumption does not vary according to product specifications and a power consumption for processing each product once in the object processing apparatus "A-001" is same between different products. Thus, as shown in the following equation, the apparatus load allotting part 117 obtains a power consumption required for processing a unit of the product "A" by dividing the power consumption per day (50) of the processing apparatus "A-001" by the total sum of the respective production numbers per day of the products. Here, however, the number of passages of each product in the processing apparatus "A-001" is different from one another, and thus the number of passages of the product is considered in the following equation.

$$\text{Power consumption required for processing one unit of the} \\ \text{product "}A\text{" in the object processing apparatus "}A\text{-}001\text{"} = \\ (\text{Power consumption of "}A\text{-}001\text{"}/ \\ \Sigma(\text{production number} * \text{number of passages of the product}) * \\ \text{the number of passages of the product "}A\text{"}) = \\ \{50/(200*1 + 200*2 + 100*1)\} * 1 = 0.07 \text{ (kWh)}$$

Here, the power consumption of "A-001" is the power consumption of "A-001" obtained in the step S34, i.e. the value stored in the processing apparatus power consumption field 139g in the record of "A-001" in the calculation result table 139 (FIG. 10). The production number per day of each product is the value for each product stored in the production number information table 137 (FIG. 8), and the number of passages of each product in each processing apparatus is the value for each product stored in the production process information table 136 (FIG. 7).

The power consumption required for processing a unit of the product "B" in the object processing apparatus "A-001" can be obtained by the above equation. However, the number of passages of the product "A" in the object processing apparatus "A-001" is one while the number of passages of the product "B" in the object processing apparatus "A-001" is two. Thus, it is possible to double the power consumption required for processing one unit of the product "A" in the object processing apparatus "A-001", to determine the obtained value as the power consumption required for processing one unit of the product "B" in the object processing apparatus "A-001".

Further, for example in the case where a power consumption for each product in the object processing apparatus "B-001 (ID: 002)" is to be obtained, the correlated specification item of the processing apparatus "B-001" is "number of surface-mount components". Thus, the apparatus load allotting part 117 assumes that a power consumption for processing each product once in the object processing apparatus "B-001" is proportional to the number of surface-mounted components of each product. Thus, as shown in the following equation, the apparatus load allotting part 117 obtains a power consumption required for processing a unit of the product "A" in this way. That is to say, the power consumption per day (150) of the processing apparatus "B-001" is divided by the total sum of values each obtained in turn by multiplying the production number per day of each product by the corresponding number of surface-mounted components. Then, the obtained value is multiplied by the number of surface-mounted components of the product "A", to obtain the power consumption required for processing a unit of the product "A". Here also, however, the number of passages of each product in the processing apparatus "A-001" is different from one another, and thus the number of passages of the product is considered in the following equation.

$$\text{Power consumption required for processing a unit of the} \\ \text{product "}A\text{" in the object processing apparatus "}A\text{-}002\text{"} = \\ (\text{Power consumption of "}A\text{-}002\text{"}/ \\ \Sigma(\text{value in the correlated specification item} * \text{production} \\ \text{number} * \text{number of passages of the product}) * \\ (\text{value in the correlated specification item} * \\ \text{number of passages of the product "}A\text{"}) = \\ \{150/(100*200*1 + 200*200*2 + 300*100*0)\} * (100*1) = \\ 0.15 \text{ (kWh)}$$

The apparatus load allotting part 117 performs the above processing for each product with respect to all the processing apparatuses constituting the object production line. Here, in the case where the correlated specification item concerning some processing apparatus is "number of surface-mounted components" or "number of layers", it is assumed that a power consumption for processing each product once in this processing apparatus is proportional to the value in the correlated specification item concerning the product. Or, however, in the case where a relation between the value in the correlated specification item and the power consumption is, for example, an inverse proportion or a proportion to the square, it is necessary to perform calculation by considering that a power consumption for the product is in inverse proportion to the value in the correlated specification item of the product, or proportion to the square of the value. Further, in the case where the correlated specification item is "none" as described above, an equation for calculating a power consumption per day in the processing apparatus becomes same as one in the case where "value of the correlated specification item" is set to "1" in the formula for calculating the power consumption per day in the processing apparatus under the existence of correlation with respect to the correlated specification item such as in the case of the correlated specification item "number of surface-mounted components".

Next, the product load calculation part 118 calculates a power consumption for a unit of each product with respect to the production line as a whole on the basis of the power consumption for a unit of each product with respect to each processing apparatus, which is obtained in the step S35. The calculated power consumption for each product is stored in the total sum field 139i in the calculation result table 139 (S36). That is to say, here, the total sum of values in records in the product power consumption field 139h for each product in the calculation result table 139 is obtained, and the obtained value is stored as the power consumption required for producing a unit of the product into the corresponding total sum field 139i of the calculation result table 139. Further, here, the power consumption per day of the line as a whole stored in the line environmental load amount table 138 (FIG. 9) is stored in the total sum field 139i for the processing apparatus power consumption field 139g.

Thus, the calculation result table 139 (FIG. 10) has been completed.

Next, the display control part 119 generates a calculation result output screen by referring to the calculation result table 139, and makes the display unit 151 display the generated screen (S37), to end a series of processes.

As shown in FIG. 17, a processing apparatus environmental load amount table 156 and a product environmental load amount table 157 are displayed in the calculation result output screen 155. The processing apparatus environmental load amount table 156 shows the power consumption 156a per day of each processing apparatus and its total sum 156b, i.e. the power consumption per day of the line as a whole. Further, the product environmental load amount table 157 shows the power consumption 157a for a unit of each product in each processing apparatus and the power consumption 157b for a unit of each product in the object production line as a whole.

As described above, in the present embodiment, actual data of processing apparatuses similar to kinds of processing apparatuses constituting the object production line are used to estimate the power consumption for each product produced in the object production line. As a result, the method of the present embodiment can estimate the power consumption of each product earlier than the method described in the document referred to in the background of the invention. Further, the present embodiment considers the power consumption of a processing apparatus considering specifications of each product, and thus can estimate the power consumption for each product more accurately.

Next, with respect to the case where it is determined to produce a product D in a design stage through the above-described object product line, a calculation procedure of a power consumption for the product D will be described referring to the flowchart shown in FIG. 18.

When the data receiving part 111 receives an instruction to perform processing of calculating an amount of a product environmental load from the input unit 152, the data receiving part 111 makes the display unit 151 display a message "Calculation of environmental load amount for a product of the production line for which the amount of the product environmental load has been already calculated?" through the display control part 119. Then, the data receiving part 111 waits to receive a reply "YES" or "NO" to this display (S40).

When "NO" is received, or in other words, when the calculation processing is to be performed with respect to a line for which the amount of the product environmental load has not been calculated yet, the data receiving part 111 proceeds to the step S31 in the flowchart shown in FIG. 15. On the other hand, when "YES" is received, the data receiving part 111 proceeds to the step S41, causes a load amount calculation data input screen 155 (such as shown in FIG. 16) to be displayed, receives data of each item concerning the product D among various kinds of items shown in this data input screen, and stores the various kinds of received data into the corresponding tables 135 and 137 (S41). In details, with respect to the product D, data of a product name item 155p, specification items 155q, 155r and 155s and a number-of-passages-of-product item 155k are received. Here, the data input screen 155 shows, from the beginning, data of the items concerning each processing apparatus and the items concerning the products A, B and C for which loads have been already calculated. And, the data in parentheses in the data input screen 155 of FIG. 16 are to be received. Among the received data, the data receiving part 111 stores data concerning the specifications of the product D in the product specification table 135 shown in FIG. 6, and data concerning the number of passages of the product D in the product process information table 136 shown in FIG. 7.

Next, the apparatus load allotting part 117 reads, from the calculation result table 139 (FIG. 10), the data of the correlated specification item field 139f for each processing apparatus and the data of the product power consumption field 139h for each processing apparatus with respect to the products whose amounts of product environmental loads have been already calculated (S42). Here, it is assumed that data read as the data on the product whose amount of product environmental load has been already calculated are data on the product "A" in the product power consumption field 139h.

Next, based on the product power consumption concerning the product "A" with respect to each processing apparatus, the apparatus load allotting part 117 obtains a product power consumption concerning the new product "D" for each processing apparatus, from numerical data of the product "D" concerning the correlated specification item for each processing apparatus and its correlation, and stores the obtained power consumption into the product power consumption field 139h for the product "D" in the calculation result table 139 (S45).

In detail, for example, in the case where a power consumption (product power consumption) required for producing a unit of the product "D" in the processing apparatus "A-001" is to be obtained, the correlated specification item of the processing apparatus "A-001" is "none". Thus, as shown in the following equation, the product power consumption for the product "D" in the processing apparatus "A-001" is obtained by multiplying the product power consumption (0.07) for the product "A" in the processing apparatus "A-001" by a ratio of the number of passages (1) of the product "D" through the processing apparatus "A-001" to the number of passages (1) of the product A through the processing apparatus "A-001".

$$\begin{aligned}&\text{Product power consumption for the} \\ &\quad \text{product ``}D\text{'' in the processing apparatus ``}A\text{-}001\text{''} = \\ &\quad (\text{product power consumption for the product ``}A\text{''} \\ &\quad\quad \text{in the apparatus ``}A\text{-}001\text{''}) * \\ &\quad (\text{number of passages of the product ``}D\text{''}/\text{the number of} \\ &\quad\quad \text{passages of the product ``}A\text{''}) = 0.07 * (1/1) = 0.07 \text{ (kWh)}\end{aligned}$$

Further, in the case where a power consumption (product power consumption) required for producing a unit of the product "D" in the processing apparatus "B-001 (ID: 002)", the correlated specification item of the processing apparatus "B-001" is "number of surface-mounted components". Thus, as shown in the following equation, the product power consumption for the product "D" in the processing apparatus "B-001" is obtained by multiplying the product power consumption (0.15) for the product "A" in the processing apparatus "B-001" by a ratio of the number of surface-mounted components (400) of the product "D" to the number of surface-mounted components (100) of the product "A" and a ratio of the number of passages (1) of the product "D" through the processing apparatus "B-001" to the number of passages (1) of the product "A" through the processing apparatus "B-001".

$$\begin{aligned}
&\text{Product power consumption for} \\
&\quad \text{the product ``}D\text{'' in the apparatus ``}B\text{-}001\text{''} = \\
&\quad (\text{product power consumption for the product ``}A\text{'' in the apparatus} \\
&\quad \text{``}B\text{-}001\text{''}) * (\text{number of surface-mounted components of} \\
&\quad \text{the product ``}D\text{''}/\text{number of suface-mounted components} \\
&\quad \text{of the product ``}A\text{''}) * (\text{number of passages of the} \\
&\quad \text{product ``}D\text{''}/\text{number of passages of the product ``}A\text{''}) = \\
&\quad 0.15 * (400/100) * (1/1) = 0.60 \text{ (kWh)}
\end{aligned}$$

The apparatus load allotting part 117 performs the above-described processing with respect to all the processing apparatuses. Here, a formula for calculating a product power consumption in a processing apparatus in the above-described case where the correlated specification item is "none" becomes same as one in the case where the ratio of numerical data of the correlated specification item of the object product "D" to numerical data of the correlated specification item of the standard product "A" is set to "1" in the formula for calculating the product power consumption for the product under existence of correlation with respect to the correlated specification item such as in the case of the correlated specification item "number of surface-mounted components".

Next, the product load calculation part 118 calculates a product power consumption for the product "D" with respect to the object production line as a whole on the basis of the product power consumption obtained in the step S45 for the product "D" with respect to each processing apparatus, and stores the obtained result in the total sum field 139i for the product "D" in the calculation result table 139 (S46). In other words, the total sum of values in the product power consumption field 139h for the product "D" in the calculation result table 139 are obtained, and the obtained value is stored in the corresponding total sum field 139i in the calculation result table 139.

Thus, the calculation result table 139 (FIG. 10) including the calculation results on the product "D" in the design stage is completed. When it is desired to obtain data of the processing apparatus power consumption field 139g in the case where the product "D" in the design stage is produced, the data in question can be obtained by receiving the production number of the product "D" in the step S41, by multiplying the value in the product power consumption field 139h for the product "D" with respect to each processing apparatus in the calculation result table 139 by the production number of the product "D" to obtain a result value, and by adding the obtained result to the value already-stored in the corresponding processing apparatus power consumption field 139g.

Next, the display control part 119 refers to the calculation result table 139 to generate a calculation result output screen, and makes the display unit 151 display this screen (S47), to end a series of processes.

As shown in FIG. 19, the calculation result output screen 158 shows a product environmental load amount table 159. A power consumption 159a for a unit of product with respect to each processing apparatus and a power consumption 159b for a unit of each product in the object production line as a whole are shown in this product environmental load amount table 159.

As described above, according to the present embodiment, if the product power consumption of some product "A" has been already obtained for each processing apparatus in the object production line, it is possible to obtain simply and quickly the product power consumption of a new product "D" in each processing apparatus in the case where the product "D" such as a product in a design stage is to be produced.

The above-described embodiment has been described taking an example where an amount of an environmental load is power consumption. It goes without saying that another amount of environmental load such as gas consumption, water consumption, carbon dioxide emission, or the like can be obtained similarly to the above.

Further, in the above embodiment, the target scope is a production line. However, the target scope may be set to a factory as a whole, a manufacturing site as a whole, or the like. Further, in the above embodiment, the measurement time for an actual amount of environmental load of a production line is one day. However, the measurement time for an actual amount of environmental load may be set to one week, one month, or the like.

Further, in the above embodiment, it is presumed that the data receiving part 111 receives data inputted through the input unit 152 such as a keyboard. However, data reproduced by the disk recording/reproducing unit 140 from data stored in a disk-type storage medium D may be received. Or, data held by another system may be received through a communication line.

The invention claimed is:

1. An article comprising a non-transitory computer readable medium having, executable instructions stored thereon for an environmental load amount calculation program that calculates an amount of an environmental load of types of products produced in an object production line that comprises processing apparatuses, wherein the environmental load amount calculation program when executed by a computer, causes the computer to perform:

a first relation acquisition step, in which, for each type of processing apparatus characteristic, an apparatus characteristic-coefficient relation that indicates a relation between the processing apparatus characteristic in question and a coefficient indicating a ratio of an actual environmental load to a rated value of environmental load of a processing apparatus is acquired and stored in a storage unit of the computer;

a second relation acquisition step, in which, for each type of processing apparatus characteristic, an apparatus characteristic-correlated specification item relation that relates the processing apparatus characteristic in question and a specification item having prescribed correlation with an amount of an environmental load of a processing apparatus among a plurality of product specification items is acquired and stored in the storage unit;

a receiving step, in which a receiving means of the computer receives: an amount of a line environmental load as an actual amount of an environmental load for a prescribed period in the object production line; each type of processing apparatus characteristic of each processing apparatus constituting the object production line; a rated value of environmental load of each type of processing apparatus constituting the object production line; and numerical data of each specification item for each type of product produced in the object production line;

a coefficient setting step, in which, for each type of processing apparatus constituting the object production line, the apparatus characteristic-coefficient relation, which is stored in the storing, unit, for each type of processing characteristic is used to determine a coefficient corresponding to the apparatus characteristic, which is received in the receiving step;

a line load allotting step, in which the line environmental load received in the receiving step is allotted to each processing apparatus by using the rated value of environmental load and the coefficient for each type of processing apparatus constituting the object production line, in order to obtain an apparatus load of each processing apparatus;

a correlated specification item setting step, in which, for each type of processing apparatus constituting the object production line, a product correlated specification item corresponding to the apparatus characteristic, which is received. in the receiving step, is determined by using the apparatus characteristic-correlated specification item relation, which is stored in the storage unit, for each type of processing apparatus;

an apparatus load allotting step, in which, by using numerical data of each product concerning the correlated specification item determined for each type of processing apparatus constituting the object production line among the numerical data, which are received in the receiving step, of the plurality of specification items of each type of product, the apparatus load, which is obtained in the line load allotting step, for each processing apparatus is allotted to each product on a basis of correlation between the numerical data of each product and an apparatus load required for processing that product, in order to obtain a product load for each product and for each type of processing apparatus; and a production environmental load amount calculation step, in which the product load obtained in the apparatus load allotting step for each apparatus and for each product is used to obtain an amount of a production environmental load required for producing a product in the object production line for each product, and the obtained production environmental load amount for each product is stored in the storage unit.

2. The article according to claim 1, wherein:
the first relation acquisition step comprises:
a first relation acquisition data receiving step, in which, for each type of processing apparatus that constituted one or more production lines different from the object production line, the receiving means receives processing apparatus characteristics of the processing apparatus, a rated value of environmental load of the processing apparatus, and an actual environmental load of the processing apparatus;
a classification step, in which the types of processing apparatuses are classified into a. plurality of categories on a basis of a plurality of processing apparatus characteristics, which is received in the first relation acquisition data receiving step, of each type of processing apparatus; and
a step of determining the apparatus characteristic-coefficient relation, in which, for each of the categories determined in the classification step, an average value of ratios of the actual environmental load to the rated value of environmental load of one or more processing apparatuses included in the category is determined as the coefficient, and the coefficient and a processing apparatus characteristic of each of the categories are related to determine the apparatus characteristic-coefficient relation.

3. The article according to claim 1, wherein:
the second relation acquisition step comprises:
a second relation acquisition data receiving step, in which, for each type of processing apparatus that constituted one or more production lines different from the object production line, the receiving means receives an actual amount of an environmental load required for processing once each type of product produced in the production line, and numerical data of each product specification item of each type of product; and
a step of determining an apparatus characteristic-correlated specification item relation, in which, information received in the second relation acquisition data receiving step is used to determine, for each type of processing apparatus characteristic, the apparatus characteristic-correlated specification item relation that relates the processing apparatus characteristic and a specification item having prescribed correlation with the actual amount of the environmental load of the processing apparatus among the plurality of product specification items.

4. The article according to claim 2, wherein:
the second relation acquisition step comprises:
a second relation acquisition data receiving step, in which, for each type of processing apparatus that constituted one or more production lines different from the object production line, the receiving means receives an actual amount of an environmental load required for processing once each type of product produced in the production line, and numerical data of each product specification item of each type of product; and
a step of determining an apparatus characteristic-correlated specification item relation, in which, information received in the second relation acquisition data receiving step is used to determine, for each type of processing apparatus characteristic, the apparatus characteristic-correlated specification item relation that relates the processing characteristic and a specification item having prescribed correlation with an amount of the environmental load of the processing apparatus among the plurality of product specification items.

5. The article according to claim 1, wherein:
the computer is made to execute:
a calculation result display step, in which an amount of the production environmental load for each product, which is stored in the storage unit, is displayed in a display unit of the computer.

6. An environmental load amount calculation method for calculating an amount of an environmental load of each type of product produced in an object production line that comprises types of processing apparatuses, wherein a non-transitory computer executes:
a first relation acquisition step, in which, for each type of processing apparatus characteristic, an apparatus characteristic-coefficient relation that indicates a relation between the processing apparatus characteristic in question and a coefficient indicating a ratio of an actual environmental load to a rated value of environmental load of a processing apparatus is acquired and stored in a storage unit of the computer;

a second relation acquisition step, in which, for each type of processing apparatus characteristic, an apparatus characteristic-correlated specification item relation that relates the processing apparatus characteristic in question and a specification item having prescribed correlation with an amount of an environmental load of a processing apparatus among a plurality of product specification items is acquired and stored in the storage unit;

a receiving step, in which a receiving means of the computer receives: an amount of a line environmental load as an actual amount of environmental load for a prescribed period in the object production line; processing apparatus characteristics of each type of processing apparatus constituting the object production line; a rated value of environmental load of each type of processing apparatus constituting the object production line; and numerical data of each specification item for each type of product produced in the object production line;

a coefficient setting step, in which, for each type of processing apparatus constituting the object production line, the apparatus characteristic-coefficient relation, which is stored in the storing unit, for each type of processing characteristic is used to determine a coefficient corresponding to the apparatus processing characteristic which is received in the receiving step;

a line load allotting step, in which the line environmental load received in the receiving step is allotted to each processing apparatus by using the rated value of environmental load and the setting coefficient for each type of processing apparatus constituting an object production line, in order to obtain an apparatus load of each processing apparatus;

a correlated specification, item setting step, in which, for each type of processing apparatus constituting the object production line, a product correlated specification item corresponding to the processing apparatus characteristic, which is received in the receiving step, is determined by using an apparatus characteristic-correlated specification item relation, which is stored in the storage unit for each type of processing apparatus;

an apparatus load allotting step, in which, by using numerical data of each product concerning the correlated specification item determined for each type of processing apparatus constituting the object production line among the numerical data, which are received in the receiving step, of the specification items of each type of product, the apparatus load, which is obtained in the line load allotting step for each processing apparatus is allotted to each product on a basis of correlation between the numerical data of each product and an apparatus load required for processing that product, in order to obtain a product load for each product and for each type of processing apparatus; and a production environmental load amount calculation step, in which the product load obtained in the apparatus load allotting step for each apparatus and for each product is used to obtain an amount of a production environmental load required for producing a product in the object production line for each product, and the amount of the production environmental load for each product is stored in the storage unit.

* * * * *